United States Patent Office 3,535,206
Patented Oct. 20, 1970

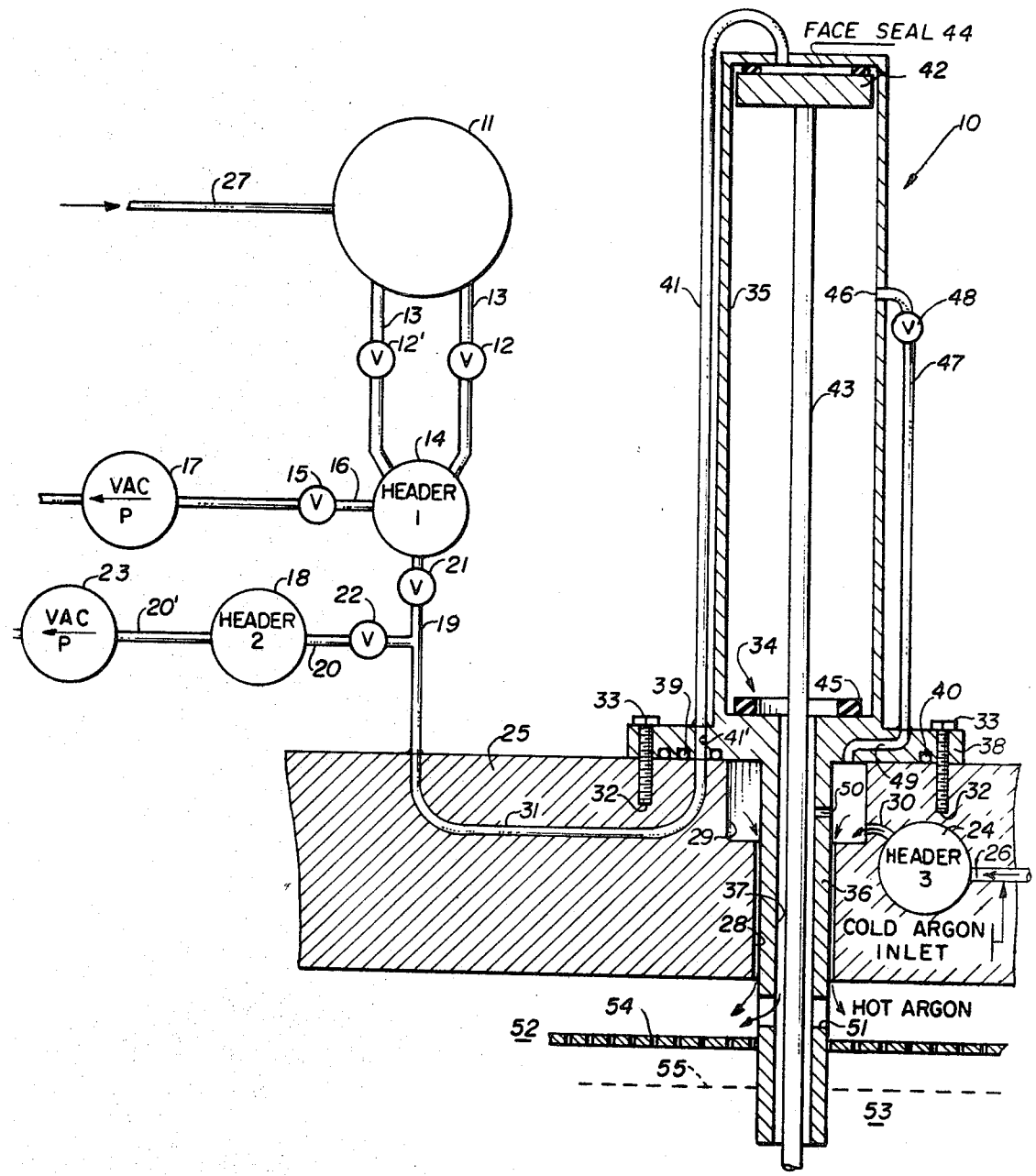

3,535,206
PNEUMATIC SCRAM ROD DRIVE
John H. Germer, San Jose, Calif., assignor to the United States of America as represented by the United States Atomic Energy Commission
Filed Aug. 8, 1968, Ser. No. 751,102
Int. Cl. G21c 7/16
U.S. Cl. 176—36     8 Claims

ABSTRACT OF THE DISCLOSURE

A single purpose drive which withdraws an individual control rod from the core of a nuclear reactor and holds it in a cocked position until a scram signal is received. The control rod is withdrawn and held in the cocked position by a vacuum pump arrangement and upon a scram signal is driven into the core by a high pressure fluid, such as argon, acting on a drive piston. Simplicity and reliability as well as inherent fail-safe features are provided with no critical sliding seals or secondary fluids employed.

BACKGROUND OF THE INVENTION

The invention described herein was made in the course of, or under, Subcontract No. W-31-109-38-1997 under AEC Contract W-31-109-ENG-38 with the United States Atomic Energy Commission.

This invention relates to control systems for nuclear reactors, particularly to a pneumatic scram rod drive utilizing no critical sliding seals or secondary fluids.

As known in the art, nuclear reactors require reliable and fast operating systems for inserting a control rod into the reactor core under certain conditions. This requirement is of particular importance for liquid metal-cooled fast breeder reactors. Various prior art efforts have been directed to a variety of methods and apparatus to provide the necessary control for reactors. While these prior systems have been effective, they are complicated and thus provide greater chance for failure thereof.

The present invention overcomes a substantial portion of the prior art problems by providing a control rod drive which is simple in construction and provides greater reliability as well as inherent fail-safe features.

SUMMARY OF THE INVENTION

The simplicity and reliability of the present invention is primarily based on pneumatic operation by means of high and low pressure fluid, such as argon gas, and in which no critical sliding seals or secondary fluids are employed. The single purpose drive withdraws individual control rods from the reactor core and holds them in a cocked position until a scram signal is received.

Therefore, it is an object of this invention to provide a pneumatic control rod drive for a nuclear reactor.

A further object of the invention is to provide a pneumatic scram rod drive, the operation of which is entirely by means of high and low pressure inert gas, such as argon.

Another object of the invention is to provide a control rod drive for nuclear reactors which offers simplicity, reliability, and inherent fail-safe features.

Another object of the invention is to provide a pneumatic scram rod drive for liquid metal-cooled reactors wherein no critical sliding seals or secondary fluids are utilized.

Another object of the invention is to provide a pneumatic control rod drive which withdraws individual control rods from the reactor core and holds them in a cocked position until a scram signal is received whereupon the drive is activated by high pressure fluid.

Other objects of the invention will become readily apparent from the following description and accompanying drawing wherein:

BRIEF DESCRIPTION OF THE DRAWINGS

The single figure is a schematic view illustrating the inventive scram rod drive system.

DESCRIPTION OF THE EMBODIMENT

As set forth above, the present invention is directed to a single purpose drive which withdraws an individual control rod from the reactor core and holds it in a cocked position until a scram signal is received, whereupon the control rod is forced into the reactor core by high pressure fluid.

While only one mechanism is illustrated for purpose of clarity, about twenty such drive mechanisms are normally required in a large reactor, the individual drive mechanisms being operatively connected to a common fluid control system described hereinafter.

A single system is required to feed all of the scram rod drives on a reactor, one such drive being indicated at 10. This system consists of a high pressure tank 11 to supply scram pressure through solenoid actuated scram valves 12 located in pressure lines 13 to a common header 14. Normally, header 14 is evacuated through a solenoid valve 15 in line or conduit 16 by a small vacuum pump 17 and the scram valves 12 remain closed. Another common header 18, connected to header 14 via lines or conduits 19 and 20 and solenoid valves 21 and 22 positioned respectively in conduits 19 and 20 for each individual drive 10, is evacuated through a line or conduit 20' by a vacuum pump 23 which is of a larger capacity than vacuum pump 17. A third common header 24 is positioned, for example, in the reactor shield plug or barrier wall 25 and is supplied with cold argon or other suitable material through inlet line or conduit 26.

While it is possible to locate all of the common headers and above described related components on the shield plug 25, a more practical arrangement would be to locate the two vacuum pumps 17 and 23 in a separate equipment room along with valve 15. However, with the components located in a separate area, disconnects would be required between components on the shield plug 25 and the other external equipment to permit raising the shield plug for refueling of the reactor, as known in the art. These disconnects would be for a pressurizing line 27 connected to supply fluid under pressure to high pressure tank 11, the two vacuum lines or conduits 16 and 20', and the cold argon inlet conduit 26. Since valve 15 is of the solenid operated type electrical disconnects would be required for the wires to this valve if it is located in a separate area such as an equipment room.

For each individual scram drive 10, shield plug 25 is provided with an aperture 28 having a countersink at the upper portion defining a space or chamber 29. A passage 30 connects chamber 29 with header 24. A passageway or manifold 31 is provided for connecting conduit 19 with drive 10 such that individual connections are not necessary if the drive 10 is replaced. Also, a plurality of threaded bores 32 are provided to accept bolts 33 which secure a housing 34 of drive 10 to shield plug 25.

The scram rod drive 10 is composed basically of housing 34, a piston and shaft assembly, and fluid conduits or lines. Housing 34 defines a closed end cylinder 35, a sleeve 36 having a passageway 37 extending therethrough and in communication with cylinder 35, and a flange 38 through which bolts 33 extend for securing the housing 34 to shield plug 25. The flange 38 of housing 34 is also provided with grooves within which seal rings 39 and 40 are located between housing 34 and plug shield 25. Inner seal ring 39 seals the passageway 31 in shield plug 25 with a line or conduit 41 having one end extending through and secured in a passage 41' in housing flange 38 and the other end thereof terminating in the upper or closed end of cylinder 35. Outer seal ring 40 isolates the internal argon system from the outside atmosphere.

A piston 42 connected to shaft 43 are located in cylinder 35 with shaft 43 extending through the passageway 37 in housing sleeve 36 for connection with a reactor control rod. A face seal 44, which may be secured to piston 42 or the end of cylinder 35, provides a seal between the piston and the cylinder when the piston-shaft assembly 42–43 are at the upper end of the cylinder. At all other positions of piston 42 in the cylinder, a tight seal is not required, provided sufficient pumping capacity is available from vacuum pump 23 to overcome this leakage and still offer enough suction to raise the control rod via shaft 43. Seal 44 may be constructed of a rubber-like compound, for example.

A snubber 45 is provided at the bottom of cylinder 35 to avoid impacting of piston 42 at the bottom of the stroke, although most of the dash-pot action is provided by compression of the argon gas in cylinder 35 in the lower part of the piston motion after it has passed a check valve port 46, port 46 being connected to one end of a conduit or line 47, with conduit 47 having a check valve assembly 48 therein, and being connected at the other end to a passageway 49 in housing flange 38 which is in fluid communication with chamber 29 in shield plug 25. Check valve 48 permits some of the gas below the piston 42 to leave cylinder 35 during the beginning of the downward stroke, thus tending to minimize rebound due to an excessive pressure buildup. Rebound is also minimized by the normal leakage past piston 42. If necessary, more than one such check valve 48 could be utilized at different heights along cylinder 35 or with different flow characteristics. When the piston 42 is lifted by suction (upward stroke) the check valve 48 closes to eliminate bypass flow. During the downward stroke the exhausted gas through check valve 48 passes to space 29, through passage 50 in sleeve 36, down past the shaft 43 in passageway 37 and out through passages 51 in sleeve 36 into a space 52 between shield plug 25 and the reatcor core sodium coolant 53, there being a baffle 54 located between passages 51 and the sodium coolant level 55 to deflect the downward flow of argon gas.

Valves 21 and 22 connect headers 14 and 18, respectively, to the individual scram rod drivers 10 via conduits 19 and 20 and passageway 31 in shield plug 25. If desired, a mechanical interlock may be provided which prevents actuation of more than one valve 22 at a time to prevent a hazardous condition which would exist with simultaneous withdrawal of all the control rods. Vacuum pump 23 may be of a smaller capacity since it would only be required to raise the control rods via shafts 43 individually and not simultaneously, particularly when utilized with a mechanical intetrlock for valves 22. The cold argon header 24 is connected to space or chamber 29 around the housing sleeve 36 and shaft 43 and provides a continuous down flow of cold argon (about 100° F.) around sleeve 36 and shaft 43 to prevent hot argon and sodium vapor in space 52 from rising through the clearance space between shaft 43 and housing sleeve 36 and between sleeve 36 and shield plug 25.

A simple magnetic device, not shown, can be built into the shield plug 25 to detect the piston 42 when said piston is in its lowest position. This, along with the vacuum indication at the top of the piston stroke, by a vacuum gauge at the pumps 17 and 23 as known in the art, eliminates all need for removable wiring connections to the drive 10.

The operation of the illustrated embodiment of the invention is as follows, starting with the reactor shutdown, the scram valves 12 closed, with the high pressure tank 11 filled, valves 21 and 22 closed and valve 15 open to evacuate header 14, the control rod connected to shaft 43 being fully inserted into the reactor core:

(1) Open valve 18 to scram rod drive 10. Vacuum pump 23 now slowly raises the piston 42 and shaft 23 in cylinder 35 with its attached control rod until piston 42 reaches the top of cylinder 35. The top of the stroke is indicated by a much higher vacuum produced by vacuum pump 23.

(2) Open valve 21 and close valve 22. The smaller capacity vacuum pump 17 is now adequate to maintain vacuum, since the face seal 44 has a very low leakage, thus piston 42 is maintained at the top of cylinder 35, the cocked position of the associated control rod.

(3) Repeat the above operation, one at a time until all scram drives are in their upper or cocked position.

(4) At this time the reactor can be brought up to criticality by separate shim rods or by appropriate displacement of other control rods as commonly known in the art.

(5) At any time the control rods can be inserted into the reactor core by merely opening the scram valves 12 to apply a high pressure fluid, such as argon gas from tank 11 to the top of piston 42 which drives the piston and associated shaft 43 and control rod downwardly, the downward movement being damped by snubber 45 and the compressed gas in the lower portion of cylinder 35.

The above described scram drive system includes the following inherent safety features:

(1) Since vacuum pump 17 is only required to maintain a vacuum under an essentially tight system, it can be of a small capacity. This means that it will be impossible to have any scram rods in other than the totally withdrawn position without causing all of the scram rods to drop.

(2) By mechanically interlocking valves 22 it would be impossible to withdraw more than one scram rod at a time. Even if this is not done, vacuum pump 23 can have a capacity that is sufficient to overcome the leakage around the piston 42 on one drive 10, but which is insufficient to raise several rods.

(3) Since no tight shaft seals are required, this mechanism is inherently from from problems of sticking and leakage.

(4) Removal of the scram rod drive is accomplished by unfastening and lifting housing 34 from shield plug 25. With the manifold arrangement 31, no tubing or wiring connections are required.

It is thus seen that the present invention advances the state of the art by providing a pneumatic scram rod drive for nuclear reactors which withdraws by suction one or more control rods from the reactor core and holds it in a cocked position until a scram signal is received whereupon the control rod is rapidly inserted into the core by high pressure fluid, such as argon gas.

While a specific embodiment of the invention has been illustrated and described, modifications will become apparent to those skilled in the art, and it is intended to cover in the appended claims all such modifications as come within the spirit and scope of the invention.

What is claimed is:

1. A pneumatic drive system for at least one control rod of a nuclear reactor comprising: a housing defining a cylinder at one end thereof and a sleeve-like member at the opposite end thereof, said housing being adapted to be mounted in an associated shield plug of an associated nuclear reactor so that said sleeve-like member is adapted to extend through an aperture in such an associated shield plug, a piston positioned in said cylinder, a shaft operatively connected to said piston and extending through said sleeve-like member and adapted to be connected to an associated reactor control rod, a tank for containing high pressure fluid, a first header means connected to said tank by first conduit means, valve means positioned in said conduit means, a second header means connected to said first header means by second conduit means, a pair of valving means positioned in said second conduit means in spaced relationship, a first vacuum creating means operatively connected via a second valve means to said first header means, a second vacuum creating means operatively connected to said second header means, and means operatively interconnecting said second conduit means with said cylinder, said interconnecting means being connected to said second conduit means at a point intermediate said spaced pair of valving means and connected to said cylinder so as to be on a side of said piston opposite said shaft.

2. The pneumatic drive system defined in claim 1, wherein each of said valve means and each of said pair of valving means is the solenoid actuated type.

3. The pneumatic drive system defined in claim 1, wherein said first and second vacuum creating means consist of first and second vacuum pumps, said first vacuum pump being of a smaller capacity than said second vacuum pump.

4. The pneumatic drive system defined in claim 1, wherein said cylinder has a cross-section larger than the cross-section of said piston, and additionally including a seal means on said side of said piston opposite said shaft adapted to substantially prevent leakage of fluid between said cylinder and said interconnecting means when said piston is located in said cylinder at the end thereof opposite said sleeve-like member of said housing.

5. The pneumatic drive system defined in claim 1, additionally including means for substantially reducing impacting forces produced by said piston impacting said housing at the end of said cylinder adjacent said sleeve-like member.

6. The pneumatic drive system defined in claim 1, additionally including a third header means, said sleeve-like member being provided with at least one aperture therein, means interconnecting said third header means with at least said aperture for supplying fluid thereto, and means for supplying coolant to said third header means, whereby associated coolant can be directed at least between said shaft and said sleeve-like member in at least a direction away from said cylinder.

7. The pneumatic drive system defined in claim 1, in combination with a reactor shield plug, said shield plug being provided with an aperture, extending therethrough, said aperture having at least two portions of different cross-section, a third header means located in said shield plug, passage means interconnecting said third header means with the larger cross-sectional portion of said shield plug aperture, means connected to said third header means for supplying coolant thereto, said housing additionally including a flange portion located intermediate said cylinder and said sleeve-like member, said housing flange portion being removably secured to said shield plug so that said sleeve-like member of said housing extends through said aperture in said shield plug, said sleeve-like member being provided with at least one aperture to provide fluid communication between said larger cross-sectional portion of said shield plug aperture and said housing internal area, dash-pot means connected between said cylinder and said larger cross-sectional portion of said shield plug aperture, said means interconnecting said second conduit means with said cylinder including a passageway in said shield plug, said passageway being connected at one end thereof to said second conduit means and at the other end thereof to a passage in said housing flange portion, and tube-like means interconnecting said passage in said housing flange portion and said cylinder, first seal means positioned about the end of said housing flange portion passage adjacent said shield plug, and second seal means positioned radially outward from said first seal means and intermediate said housing flange and said shield plug.

8. The combination defined in claim 7, wherein said dash-pot means includes a fluid passage through said housing flange portion providing fluid communication with said larger cross-sectional portion of said shield plug aperture, conduit means interconnecting said fluid passage in said housing flange portion with an aperture in said cylinder wall, and check valve means mounted in said conduit means.

References Cited

UNITED STATES PATENTS

| 3,031,397 | 4/1962 | Fortescue et al. | 176—36 X |
| 3,162,578 | 12/1964 | Allen | 176—36 |
| 3,170,844 | 2/1965 | Nicoll | 176—36 |
| 3,347,748 | 10/1967 | Olsson | 176—36 |

CARL D. QUARFORTH, Primary Examiner

H. E. BEHREND, Assistant Examiner

U.S. Cl. X.R.

91—450